United States Patent Office 3,809,633
Patented May 7, 1974

3,809,633
CHAIN EXTENDED POLYTHIOETHER POLYENE PHOTOCURABLE COMPOSITIONS
Frank Magnotta, Laurel, Arthur D. Ketley, Ellicott City, and Clifton L. Kehr, Silver Spring, Md., assignors to W. R. Grace & Co., New York, N.Y.
No Drawing. Filed Mar. 8, 1972, Ser. No. 232,904
Int. Cl. C08d 1/00; C08f 1/16; C08g 11/54
U.S. Cl. 204—159.14
11 Claims

ABSTRACT OF THE DISCLOSURE

Novel chain-extended polythioether containing polymer compositions having a multiplicity of reactive unsaturated carbon to carbon functional groups and/or reactive thiol groups within the molecule. These highly reactive polymer compositions are rapidly curable to solid, cross-linked polythioether products in the presence of a free radical generator such as actinic radiation. These non-ionic chain extended photocurable compositions are prepared by polymerizing polyenes and polythiols in the presence of free radical generators such as actinic radiation or oxygen. The chain extended polythioether containing polymers which are solvent soluble, particularly water soluble have a molecular weight in the range of 300 to 250,000 and range from liquid to solid materials which are essentially gel free i.e. having a gel content of not greater than about 1%.

BACKGROUND OF THE INVENTION

This invention relates to chain extended, solvent soluble polythioether containing polymer compositions which are curable to solid solvent insoluble products. More particularly this invention relates to chain-extended polythioether containing polymer compositions having multiplicity of reactive unsaturated carbon-to-carbon functional groups and/or reactive thiol functional groups within the molecule. One group of the subject polymer compositions e.g. the polythioether containing polyene-polythiol compositions i.e. containing both aforesaid functional groups are self-curable to cross-linked polythioether products in the presence of free radical generators. Another group which includes the polythioether containing polythiols or polythioether containing polyenes when compounded respectively with additional polyenes or polythiols can likewise be cured to solid polythioether products in the presence of free radical generators.

It is known that polyenes having at least two reactive unsaturated carbon to carbon groups per molecule are curable by polythiols having two thiol groups to solid polythioether resins or elastomers in the presence of free radical generators such as actinic radiation. However these photocurable compositions as described in prior art require relatively higher levels of actinic radiation than the subject chain-extended photocurable compositions in order to form cured products having identical characteristics. In the preparation of imaged surfaces from polyene-polythiol containing compositions it is highly desirable that these photocurable compositions exhibit short exposures as measured by energy required to achieve a specific film thickness of the cured material. Generally, these prior art photocurable compositions have exposure energy requirements of more than 10 millijoules/cm.² (mj./cm.²) generally at least 30 mj./cm.² or more in order to obtain film thickness of 80–100μ.

In accordance with this invention, the defects of the aforementioned prior art photocurable compositions have been overcome by the practice of this invention which provides novel nonionic chain-extended polythioether containing polymer compositions which are rapidly photocurable under the conditions as set forth herein to yield cross-linked polythioether products having improved characteristics. Highly satisfactory cured polythioether products are obtained by irradiating these highly reactive chain-extended polythioether containing polymer compositions of the instant invention with not more than 10 mj./cm.² of actinic radiation in order to achieve a film thickness of 80–100μ. In compositions containing opaque pigments such as carbon black, this thickness results in the cured film having a diffuse density of 1.0. Thus, the subject chain-extended photocurable compositions are cured to solids at least 5 times faster and generally 20 to 400 times faster than the aforementioned prior art non chain-extended polyene-polythiol containing photocurable compositions.

Generally speaking, the chain-extended polythioether containing polymer compositions are nonionic, solvent soluble, particularly water soluble, polymeric materials having a molecular weight in the range of 300 to 250,000 and preferably 1000 to 100,000. These chain-extended polythioether containing compositions are liquid or solid materials which are essentially gel free, i.e., having a gel content of not greater than about 1 percent.

The instant chain-extended polythioether compositions are formed from a composition consisting essentially of (1) a polyene containing at least two reactive unsaturated carbon to carbon bonds per molecule and (2) a polythiol containing at least two thiol groups per molecule, the total combined functionality of (a) the reactive unsaturated carbon to carbon bonds per molecule in the polyene and (b) the thiol groups per molecule in the polythiol being greater than 4.

As used herein polyenes and polyynes refer to a simple or complex species of alkenes or alkynes having a multiplicity, i.e., at least 2 "reactive" carbon to carbon unsaturated functional groups per average molecule. For example, a diene is a polyene that has two "reactive" carbon to carbon double bonds per average molecule, while a diyne is a polyyne that contains in its structure two "reactive" carbon to carbon triple bonds per average molecule. Combinations of "reactive" triple bonds within the same molecule are also operable. An example of this is monovinylacetylene, which is a polyeneyne under our definition. For purposes of brevity all these classes of compounds will be referred to herein as polyenes.

As used herein the term "reactive" unsaturated carbon to carbon groups means groups which will react under proper conditions as set forth herein with thiol groups to yield the thioether likage

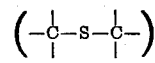

as contrasted to the term "unreactive" carbon to carbon unsaturation which means

groups when found in aromatic nucleii (cyclic structures exemplified by benzene, pyridine, anthracene, and the like) which do not under the same conditions react with thiols to give thioether linkages. In the instant invention, products from the reaction of polyenes with polythiols which contain 2 or more thiol groups per average molecule are called polythioether containing polymers or polythioethers.

One group of polyenes operable in the instant invention to react with polythiols to form the subject chain-extended polythioether containing polymer compositions taught in British Pat. No. 1,215,591 assigned to the same assignee and incorporated herein by reference. This group includes those having a molecular weight in the range of 64 to 20,000, preferably about 200 to 20,000 of the general formula $[A]\text{-}(X)_m$ wherein X is a member of the group consisting of

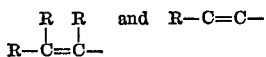

m is at least 2; R is independenly selected from the group consisting of hydrogen, halogen, aryl, substituted aryl, cycloalkyl, substituted cycloalkyl, aralkyl, substituted aralkyl and alkyl and substituted alkyl groups containing 1 to 16 carbon atoms and A is a polyvalent organic moiety free of (1) reactive carbon to carbon unsaturation and (2) unsaturated groups in conjugation with the reactive ene or yne groups in X. Thus A may contain cyclic groupings and minor amounts of hetero atoms such as N, S, P or O, but contains primarily carbon-carbon, carbon-oxygen or silicon-oxygen chain linkages without any reactive carbon to carbon unsaturation.

The preferred polyenes are set out in U.S. 3,615,450 and assigned to the same assignee and incorporated herein by reference. These polyenes are those wherein the A member in the above formula is connected to said X member by a divalent chemically compatible connecting linkage selected from the group consisting of $$-(CH_2)d-, \quad -O-(CH_2)d-, \quad -S-(CH_2)d- \text{ and}$$

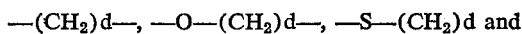

wherein $d$ is an integer from 0 to 12. In this instance, the polyene can be defined as having a general formula: $[A]-(Y)_m$, wherein $m$ is at least 2; and Y is a member selected from the group consisting of (a) $-[CH_2]_d-CH=CH_2$
(b) $-O-[CH_2]_d-CH=CH_2$
(c) $-S-[CH_2]_d-CH=CH_2$
(d) 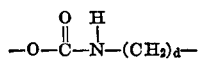

wherein one or more of said members (a) to (d) are connected to [A] through a polyvalent chemically compatible derivative member of the group consisting of —O—, —S—, urethane and substituted urethane, carboxylate, carbonate, urea and substituted urea, amide and substituted amide, amine and substituted amine, silane and substituted silane, phosphate, phosphonate, aryl and substituted aryl, alkaryl and substituted alkaryl, cyclo-alkyl and substituted cycloalkyl and alkyl having 1 to 16 carbon atoms; wherein $d$ is an integer from 0 to 12, preferably 0 or 1; A is a stable, polyvalent, polymeric radical member free of (1) reactive carbon to carbon unsaturation, and (2) highly water-sensitive members; and is selected from the group consisting of aryl, substituted aryl, aralkyl, substituted aralkyl, cycloalkyl, substituted cycloalkyl and alkyl and substituted alkyl groups containing 1 to 36 carbon atoms, said group members can be internally connected to one another by a polyvalent chemically compatible linkage selected from the group consisting of —O—, —S—, carboxylate, carbonate, carbonyl, urethane and substituted urethane, urea and substituted urea, amide and substitued amide, amine and substituted amine, silane and substituted silane, silicate, phosphonate, phosphite, phosphate, aryl and substituted aryl, alkaryl and substituted alkaryl, cycloalkyl and substituted cycloalkyl and alkyl having 1 to 16 carbon atoms.

Preferred example of operable aryl members are either phenyl or naphthyl, and of operable cycloalkyl members which have from 3 to 8 carbon atoms. Likewise, preferred substituents on the substituted members may be such groups as nitro, chloro, fluoro, acetoxy, acetamido, phenyl, benzyl, alkyl and alkoxy of 1 to 9 carbon atoms, and cycloalkyl of 3 to 8 carbon atoms.

As used herein, the term polyvalent means having a valence of two or greater.

Examples of operable polyenes from this group include, but are not limited to (1) Crotyl-terminated polyurethanes which contain two "reactive" double bonds per average molecule in a near terminal position of the average general formula:

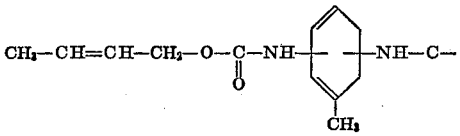

wherein $x$ is at least 1, (2) The followiing structure which contains terminal "reactive" double bonds.

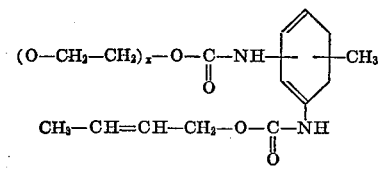

where $x$ is at least 1, (3) The following structure which contains terminal "reactive" double bonds:

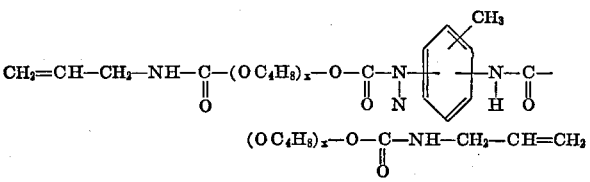

where $x$ is at least 1, and (4) The following structure which contains near terminal "reactive" double bonds:

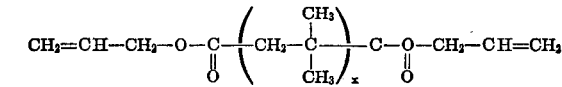

where $x$ is at least 1.

Also suitable are polyenes having vinyl or allyl ether and groups as exemplified by the following non-limiting structures:

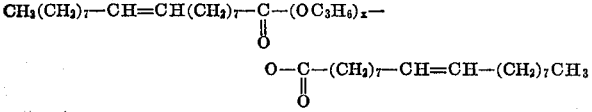

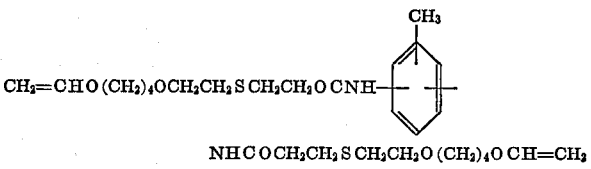

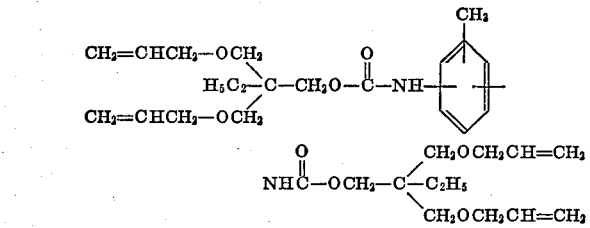

It is preferred that the A member of the aforesaid polyenes contain at least one poly(alkylene oxide) group. These groups illustrate —O— linkages internally connecting the A group members as exemplified by the following units $([CH_2]_g-O-)_w$, $(C_2H_4O)_x$, $[-C_3H_6O]_y-$ and $(C_4H_8O)_z$ wherein $w$, $x$, $y$, and $z$ are integers of at least 1 and $g$ is an integer from 1 to 9. Suitable polyenes containing aforesaid units are those wherein $w$, $x$, $y$ and $z$ range from 20 to $10^6$.

The chain-extended polythioether containing polymer compositions formed from polyenes having poly(ethylene oxide) backbone, i.e., —(C₂H₄O)ₓ units where x is at least 15 incorporated within the chain of the molecule are generally water soluble. An example of suitable water soluble polyene is:

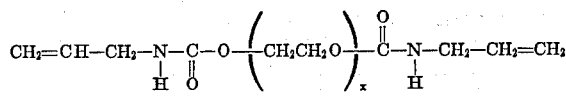

where x is 15 to 500, preferably 20 to 150.

As used herein, the term polythiol refers to the simple or complex organic compounds having a multiplicity, i.e., at least 2, of pendant or terminally positioned —SH functional groups per average molecule.

On the average the polythiols must contain 2 or more —SH groups/molecule. They usually have a viscosity range of 0 to 20 million centipoises (cps.) at 130° C. as measured by a Brookfield viscometer. Included in the term "polythiols" as used herein are those materials which in the presence of an inert solvent, aqueous dispersion or plasticizer fall within the viscosity range set out above at 130° C. Operable polythiols in the instant invention usually have molecular weights in the range 80–20,000, preferably 100–10,000.

The polythiols operable in the instant invention can be exemplified by the general formula: $R_8$—$(SH)_n$ where $n$ is at least 2 and $R_8$ is a polyvalent organic moiety free from "reactive" carbon to carbon unsaturation. Thus $R_8$ may contain cyclic groupings and minor amounts of hetero atoms such as N, P or O but primarily contains carbon-carbon, carbon-hydrogen, carbon oxygen or silicon-oxygen containing chain linkages free of any "reactive" carbon to carbon unsaturation.

One class of polythiols operable with polyenes in the instant invention to obtain the chain-extended polythioether containing polymer compositions are esters of thiol-containing acids of the general formula: HS—$R_9$—COOH where $R_9$ is an organic moiety containing no "reactive" carbon to carbon unsaturation with polyhydroxy compounds of the general formula: R—$(OH)_n$ where $R_{10}$ is an organic moiety containing no "reactive" carbon to carbon unsaturation and $n$ is 2 or greater. These components will react under suitable conditions to give a polythiol having the general structure:

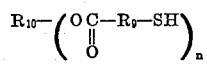

where $R_9$ and $R_{10}$ are organic moieties containing no "reactive" carbon to carbon unsaturation and $n$ is 2 or greater.

Certain polythiols such as the aliphatic monomeric polythiols (ethane dithiol, hexamethylene dithiol, decamethylene dithiol, tolylene - 2,4-dithiol, etc.) and some polymeric polythiols such as a thiol-terminated ethylcyclohexyl dimercaptan polymer, etc. and similar polythiols which are conveniently and ordinarily synthesized on a commercial basis although having obnoxious odors, are operable in this invention. Examples of the polythiol compounds preferred for this invention because of their relatively low odor level and fast reaction rate include, but are not limited to, esters of thioglycolic acid (HS—CH₂COOH), α - mercaptopropionic acid (HS—CH(CH₃)—COOH) and β - mercaptopropionic acid (HS—CH₂CH₂COOH) with polyhydroxy compounds such as glycols, triols, tetraols, pentaols, hexaols, etc. Specific examples of the preferred polythiols include but are not limited to ethylene glycol bis(thioglycolate), ethylene glycol bis(β-mercaptopropionate), trimethylolpropane tris(thioglycolate), trimethylolpropane tris(β-mercaptopropionate, pentaerythritol tetrakis(thioglycolate) and pentaerythritol tetrakis(β-mercaptopropionate), all of which are commercially available. A specific example of a preferred polymeric polythiol is polypropyleneether glycol bis(β - mercaptopropionate) which is prepared from polypropyleneether glycol (e.g., Pluracol P2010, Wyandotte Chemical Corp.) and β-mercaptopropionic acid by esterification.

The term "functionality" as used herein refers to (a) the average number of ene groups per molecule in the polyene reactant (or in the chain-extended polythioether containing polyene product; or (b) to the average number of thiol groups per molecule in the polythiol reactant or in the chain-extended polythioether containing polythiol product; or (c) to the average number ene and thiol groups per molecule in the chain-extended polythioether containing polyene-polythiol product. For example, a triene is a polyene with an average of three "reactive" carbon to carbon unsaturated groups per molecule and thus has a functionality (f) of three. A dithiol is a polythiol with an average of two thiol groups per molecule, and thus has a functionality (f) of two. A chain-extended polythioether containing diene-dithiol product is a polythioether containing polyene-polythiol with an average of two "reactive" carbon to carbon unsaturated groups and two thiol groups per molecule, and thus a total functionality (f) of four.

As used herein, polythioether containing polythiol refers to a chain-extended polythiol having a functionality of at least 4, and essentially free of reactive carbon to carbon unsaturated groups, said polythiol being a reaction product of a polyene having a functionality of at least 2 and a polythiol having a functionality of at least 3.

As used herein, polythioether containing polyene refers to a chain-extended polyene having a functionality of at least 4, and essentially free of thiol groups, said polyene being a reaction product of a polythiol having a functionality of at least 2 and a polyene having a functionality of at least 3.

As used herein, polythioether containing polyene-polythiol refers to a chain-extended polyene-polythiol having a total functionality of at least 3, said polyene-polythiol being a reaction product of a polyene and a polythiol having a total combined functionality of at least 5 and the functionality of each polyene and each polythiol being at least 2.

As used herein, chain-extended polythioether polymers refers to polythioether polymers having structures which are essentially free of a cross-linkd three dimensional networks.

In forming the self-curable chain extended polythioether containing polyene-polythiols of the instant invention, the reaction components of the polyenes and polythiols are formulated in such a manner that, on curing, the product self-curable chain-extended polythioether containing polyene-polythiols give a solid, cross-linked, three dimensional polythioether polymer system. In order to achieve such infinite network formation, the sum of the -ene and -thiol functionalities of the polyene-polythiol must always be equal to or greater than 3. Blends and mixtures of the polyenes and the polythiols containing said functionality are also operable herein.

In general, it is preferred, especially at or near the operable lower limits of functionality in the self-curable chain-extended polyene-polythiol, to use compounds in which the -thiol and the -ene functions are present in such amounts that there is one -thiol group present for each -ene group, it being understood that the total functionality of the system must be equal to or greater than 3. For example, if the chain-extended self-curing polyene-polythiol contains 3 -ene groups per molecule, it is desirable that it also contain 3 -thiol groups.

Thus, the mole ratio of ene/thiol groups in the self-curable chain-extended polythioether containing polyene-polythiol product is from about 0.5/1.0 to about 2.0/1.0, preferably 0.8/1.0 to about 1.2/1.0 group ratio.

The chain-extended polythioether containing polythiols of the subject invention are formed from the reaction components of a polythiol having a functionality of at least 3. The mole ratio of the reactant polythiol and polyene for preparing these chain-extended polythiols is from about 2.0/1.0 to about 20.0/1.0, preferably about 2.0/1.0 to about 5.0/1.0 mole ratio.

Similarly, the chain-extended polythioether containing polyenes of the subject invention are formed from the reaction components of a polythiol having a functionality of at least 2 and of a polyene having a functionality of at least 3. The mole ratio of the reactant polyene and polythiol for preparing these chain-extended polyenes is from about 2.0/1.0 to about 20.0/1.0, preferably about 2.0/1.0 to about 5.0/1.0 group ratio.

It must be noted that in forming the chain-extended polythioether containing polythiols or polyenes, there is always at least a twofold stoichiometric excess of the polythiol or polyene reactant, respectively.

Unlike the chain-extended polythioether containing polyene-polythiol products of the instant invention which possess a multiplicity of -ene and -thiol functional groups and thus are self-curable to solid cross-linked products upon exposure to free radical generators, the subject chain-extended polythioether containing polythiols or polyenes will cure only upon the addition of the necessary amount of unreacted polyene or polythiol, respectively.

In adding the appropriate polyene or polythiol reactant, the preferred stoichiometry is the same as that required for forming the aforementioned self-curable polythioether containing polyene-polythiol, i.e., the same mole ratio of ene/thiol groups is necessary to form the final desired solid cured polythioether end product.

The polymerization reaction of the polyene and polythiol for producing the chain-extended polythioether containing polymers of the instant invention can be initiated by actinic radiation or oxygen.

A class of actinic light light useful herein is ultraviolet light and other forms of actinic radiation suitably in the wavelength range of about 2000–6500 A. which are normally found in radiation emitted from the sun or from artificial sources such as Type RS Sunlamps, black light UV lamps, carbon arc lamps, xenon arc lamps, mercury vapor lamps, tungsten halide lamps and the like. Ultraviolet radiation may be used most efficiently if the photopolymerizable polyene/polythiol composition contains a suitable photoinitiator i.e. photosensitizer.

Various photosensitizers are operable and well known to those skilled in the art. Examples of photosensitizers include, but are not limited to, benzophenone, acetophenone, acenapthene-quinone, methyl ethyl ketone, valerophenone, hexanophenone, 8-phenylbutyrophenone, p-morpholinopropiophenone, dibenzosuberone, 4 - morpholinobenzophenone, 4'-morpholinodeoxybenzoin, p-diacetylbenzene, 4 - aminobenzophenone, 4' - methoxyacetophenone, benzaldehyde, α-tetralone, 9-acetylphenanthrene, 2 - acetylphenanthrene, 10 - thioxanthenone, 3-acetylphenanthrene, 3 - acetylindole, 9 - fluorenone, 1-indanone, 1,3,5 - triacetylbenzene, thioxanthen-9-one, xanthene-9-one, 7 - H - benz[de]anthracen-7-one, 1-naphthaldehyde, 4,4'-bis(dimethylamino)benzophenone, fluorene-9-one, 1'-acetonaphthone, 2'-acetonaphthone and 2,3-butanedione, etc. which serve to give greatly reduced exposure times. To initiate the photo polymerization, only minor quantities of photosensitizer are required. The photosensitizers are usually added in an amount ranging from about 0.01 to 1.0 percent by weight, preferably 0.05 to 0.5 percent, of the photopolymerizable polyene/polythiol composition in the instant invention.

It is to be noted, however, that when the subject chain-extended polythioether containing polymers are ready to be photocured to solid products, the amount of photosensitizer present in the photocurable composition may be increased. Thus, in the photocuring step, the total amount of photosensitizer, i.e., photocuring rate accelerator, may range from about 0.05 to 5.0 percent by weight, preferably 0.01 to 20.0 percent, of the photocurable polyene/polythiol composition. The aforementioned total quantity of photosensitizer is applicable to all the subject photo curable chain-extended polythioether containing polymers prepared according to the light or oxygen induced techniques of the instant invention. Thus, in preparing the subject chain-extended polythioether containing polyene-polythiol or polythioether containing polythiols or polyenes using the actinic light induced process, the required amount of polyene and polythiol reactants are mixed together and exposed to a suitable source of actinic light, preferably in the wavelength of 2200–4000 A. under ambient conditions and the photopolymerization is conducted up to a point so that the resulting chain-extended polythioether polymers are essentially gel free, i.e., having a gel content of not greater than about 1 percent.

The percent gel is indicative of the percentage of polymer that is cross-linked. The percent gel content of the chain-extended polymers can be measured by refluxing a weighed sample of polymer in a suitable solvent, in which the chain-extended polymer is soluble, at an elevated temperature for a specific length of time. The insoluble portion of the polymer sample after drying is then weighed. After the weights of the initial and final sample are corrected for polymer and inert insoluble additives (if present) such as fillers, e.g., carbon black, the percent gel is calculated as follows:

$$\text{Percent gel} = \frac{\text{corrected weight insoluble sample}}{\text{corrected initial weight sample}} \times 100$$

Suitable solvents for the chain-extended polythioether containing polymer compositions described herein include but are not limited to water, or aqueous solution containing a soap or detergent, alcohols such as ethanol, methanol or mixtures of the latter with methyl, ethyl or propylacetate, methylethylketone, xylene, benzene, heptane and the like.

To obtain chain-extended polymers having the latter characteristic, the photopolymerization is preferably conducted to some point short of gelation, i.e., close to but not at the gel point. However, in many instances, essentially gel-free materials can be obtained if the polyene/polythiol components are pre-exposed up to or just past the gel point.

The resulting chain-extended polythioether containing polymers are nonionic and solvent soluble and are rendered solvent insoluble upon curing in the presence of a free radical generator. The chain polythioether containing polyene-polythiol compositions are self-curable (i.e., require no additional amount of polyene or polythiol component) prior to exposure to free radical generators. However, the chain-extended polythioether containing polythiols or polyenes require the addition of polyene or polythiol, respectively, in order to cure to solids.

The conditions at which the photopolymerization of the polyene/polythiol composition is conducted can vary over a wide range. Operable reaction temperatures range from 0 to 100° C., preferably at temperatures from about 20 to 30° C. Generally, the rate of the photopolymerization reaction may be increased by increasing the temperature of the polyene/polythiol composition at the time of the initiation of the photopolymerization.

The photopolymerization reaction is generally conducted at atmospheric pressure, although various pressures, e.g., from 0.1 to 100 atmospheres are operable. The photopolymerization is preferably conducted in the absence of solvents, however, solvents may be used. Suitable solvents include conventional aliphatic and aromatic compounds as well as various types of polar solvents. Useful solvents include but are not limited to saturated aliphatic hydrocarbons, ethers, thioethers, alcohols, halogenated aliphatic compounds, as well as substituted and unsubstituted hydrocarbon aromatic solvents. Representative non-limiting examples of such solvents include pentane, cyclohexane, ethylene glycol monoethyl ether, glyme, dimethyl sulfide, isopropanol, benzene, ethyl benzene, chlorobenzene, bromobenzene, carbon tetrachloride and the like.

When using the pre-exposure technique to prepare the selfcurable chain-extended polythioether containing polyene-polythiols, preferably the polyene/polythiol composition is photopolymerized as a thin layer of film, e.g., from 0.01 to 0.5 inch thick. A convenient apparatus for conducting reaction consists of a quartz or Pyrex cylinder, containing a UV lamp, the cylinder being rotated about its axis. The polyene and polythiol are poured as a thin film on the surface of the cylinder and the product removed by a doctor blade after an appropriate reaction time. However, satisfactory results are obtained if other well-known photochemical reaction techniques are utilized such as reaction in an inert solvent carried in a stirred photochemical reaction vessel.

In the alternate polymerization method, an oxygen induced process is utilized for preparing the subject chain-extended polythioether containing polymer compositions. This oxygen induced polymerization, i.e., oxygenation technique is preferably used to prepare the self-curable chain-extended polythioether containing polyene-polythiol polymers. However, this method is likewise operable for preparing the chain-extended polythioether containing polyenes or polythiols of the instant invention. In accordance with this process, the polyene/polythiol composition is polymerized at ambient temperatures and pressures under an atmosphere of oxygen. Preferably the reaction is carried out in the absence of actinic radiation. For example, the polymerization can be conveniently conducted in a dark, i.e., non-light transmitting vessel. The subject polymerization is conducted up to a point so that the resulting chain-extended polythioether containing polymers are essentially gel free, i.e., having a gel content of not greater than about 1 percent. As in the case of the chain-extended polymers of the instant invention prepared via the afore described photopolymerization, i.e., preexposure technique, the subject polymerization via the oxygenation technique is conducted up to some point short of gelation. Generally, the rate of polymerization via this oxygen induced step is slower than the aforementioned photopolymerization process. However, the polymerization rate may be increased by the addition of suitable chemical free radical generating compounds. Suitable chain-extended polythioether containing polymers are prepared when the polymerization is conducted for a period of 1 hour to 4 days.

Azo or peroxidic compounds (with or without amine accelerators) which decompose at ambient conditions are operable as free radical generating agents capable of accelerating the polymerization reaction conducted in the oxygen atmosphere. Useful nonlimiting free radical precursors include benzoyl peroxide, di-t-butyl peroxide, cyclohexanone peroxide with dimethyl aniline or cobalt naphthenate as an accelerator; hydropreoxides such as hydrogen peroxide, cumene hydroperoxide, t-butyl hydroperoxides; peracid compounds such as t-butylperbenzoate, peracetic acid; persulfate such as ammonium persulfate; azo compounds such as azobis-isovalero-nitrile and the like. These free radical generating agents are usually added in amounts ranging from about 0.001 to 10 percent, preferably 0.01 to 10 percent, of the polymerizable polyene/polythiol composition. In a typical example, a polymerizable polyene/polythiol composition was stirred under an oxygen blanket for a period of two days, yielding a solvent soluble chain-extended polythioether containing polyene-polythiol product. The experiment was repeated except that 1 percent $H_2O_2$ solution was added, and the same product was obtained with only 3 hours of stirring under oxygen. Operable reaction conditions of temperature, pressure and solvents for the oxygen induced polymerization are the same as those disclosed in the aforementioned photopolymerization, i.e., light induced technique. However, the preferred temperature range is from about 20 to 60° C. When the polymerization is conducted under the oxygen atmosphere, it is preferred that photosensitizer be included in the polymerizable polyene/polythiol composition. The various types of photosensitizers and amounts are the same as those previously disclosed as being operable for all the subject photocurable chain-extended polythioether containing polymers.

The subject polyene/polythiol compositions polymerizable by either the light induced or oxygen induced process of the instant invention, to chain-extended polythioether containing polymers, which upon curing can be converted to solid crosslinked resins or elastomers in accord with the present invention may, if desired, include such additives as antioxidants, accelerators, dyes, inhibitors, activators, fillers, pigments, antistatic agents, flame-retardant agents, thickeners, thixotropic agents, surface-active agents, light scattering agents, viscosity modifiers, extending oils, plasticizers, tackifiers and the like within the scope of this invention. Such additives may be present in quantities up to 500 parts or more per 100 parts polyene/polythiol by weight, and preferably about 0.0005 to about 300 parts on the same basis.

When the polymerization or subsequent curing of the instant chain-extended polymers is affected by irradiation, the additives should be present in amounts which do not inhibit or interfere with necessary passage of radiation. Such additives are usually preblended with the curable chain-extended polythioether containing polymer compositions prior to or during the compounding step of the curing process. Furthermore, it is preferred that these additives be preblended with the polyene or polythiol prior to or during the oxygen induced polymerization process used in preparing the subject chain-extended polythioether containing polymers. If desired, these additives may be preblended in a similar manner during the light induced, i.e., photopolymerization process of the instant invention.

The curable chain-extended polythioether containing polymer compositions prior to curing may readily be pumped, poured, siphoned, brushed, sprayed, doctored, or otherwise handled as desired. Following application, curing in place to a solid resin or elastomer may be effected either very rapidly or extremely slowly as desired by manipulation of the compounding ingredients and the method of curing.

The subject chain-extended polythioether containing compositions, prior to curing, may be admixed with or blended with other monomeric and polymeric materials such as thermoplastic resins, elastomers or thermosetting resin monomeric or polymeric compositions. The resulting blend may be subjected to conditions for curing or co-curing of the various components of the blend to give cured products having unusual physical properties.

The curing reaction of the chain-extended polythioether containing polymer compositions may be initiated by any free radical generator. Operable curing initiators or accelerators include radiation such as actinic radiation, e.g., ultraviolet light; ionizing radiaton such as gamma radiation, X-rays, corona discharge, etc.; as well as chemical free radical generating compounds such as azo, peroxidic, etc., compounds utilized in the aforementioned oxygen induced polymerization process used for preparing the subject curable chain-extended polythioether containing compositions. Depending on the source of free radical generators, the curing period of the instant invention may vary from about 0.01 second to about 10 seconds.

The preferred free radical generator for the curing reaction is actinic radiation, suitable in the wavelength range of 2000–4500 A.

Operable sources of actinic radiation are those previously disclosed as being suitable for preparing the chain-extended polythioether containing polymer compositions by the photopolymerization process, i.e., preexposure technique. As in the latter case, ultraviolet radiation may be used more efficiently if the photocurable chain-extended polythioether containing polymer compositions contains a suitable photocuring rate accelerator, i.e., photosensitizer. The various operable photosensitizers and amounts have been already described in polymerization methods of the instant invention used for preparing the subject chain-extended polythioether containing polymer compositions.

The unique feature of one class of chain-extended polymer compositions of the instant invention, i.e., the chain-extended polythioether containing polyene-polythiol compositions, is that these polymers are self-curable when exposed to a suitable free radical generator. Thus, in accordance with this invention, it is possible merely to expose these highly reactive chain-extended compositons to the desired source actinic radiation, preferably in the range of 2200–4000 A., under ambient conditions and obtain a solid cured material. The instant chain-extended photocurable compositions, i.e., the self-curable polythioether containing polyenes, polythiols or the chain-extended polythioether containing polyenes or polythiols when compounded with the required amount of polythiol or polyene, respectively, require lower levels of actinic radiation than prior art polyene/polythiol photocurable compositions in order to obtain solid cured polythioether products having identical or improved characteristics.

Generally, the rate of curing reaction may be increased by increasing the temperature of the photocurable composition at the line of initiation of cure. In many applications, however, curing is accomplished conviently and economically by operating at ordinary room temperature conditions. A typical chain-extended photocurable composition of the instant invention contains a chain-extended polythioether containing polyene-polythiol polymer (or a chain-extended polythioether containing polyene or polythiol, and the additional amount of polythiol or polyene respectively), photosensitizer, pigment, other inert additives and antitoxidant or stabilizer. Such stabilized compositions generally can be stored in closed containers in the dark for extended periods of time without curing, but on exposure to actinic radiation will cure rapidly and controllably to solid products.

Conventional during inhibitors or retarders which may be used in order to stablize the chain-extended photocurable compositions so as to prevent premature onset of curing include, but are not limited to hydroquinone; p-tert.-butyl catechol; 2,6-di-tert.-butyl-p-methylphenol; phenothiazine; N-phenyl-2-naphthylamine; phosphorous acid; dilauryl phosphite, inert gas atmospheres such as helium, argon, nitrogen and carbon dioxide; vacuum; and the like.

The curable chain-extended polythioether containing polymer compositions of the instant invention are used in preparing solid cured polythioether polymeric products having many and varied uses, examples of which include but are not limited to adhesives; sealants; coatings; impregnants for porous substrates; molded articles; image surfaces, e.g., printing plates, silverless photographic materials, photoresists and the like.

Since the subject chain-extended photocurable polymer compositions are very reactive photosensitive materials, they are particularly useful in the preparation of imaged surfaces. The general method for preparing imaged surfaces, such as silverless photographic materials, photoresists, offset printing plates, etc., comprises coating the chain-extended photosensitive composition on a support, e.g., plastic, glass, metal, paper and the like; exposing image-wise either directly using "point" radiation or through an image bearing transparency, e.g., photographc negative or positive or a mask, e.g., stencil, to radiation, e.g., U.V. light until substantially complete solidification on the photosensitive composition occurs in the exposed areas and essentially no solidification takes place in the unexposed areas; and thereafter removing, e.g., with an appropriate solvent, the unexposed, i.e., non-imaged, areas. The resulting products are cured latent images on suitable supports.

Operable methods for preparing silverless photographic materials using the subject chain-extended polythioether containing polymer photosensitive compositions is disclosed in U.S. Pat. 3,623,879 assigned to the same assignee. A convenient method of carrying out the process as taught in the latter application is to place an image bearing positive or negative continuous tone transparency in a contact frame or enlarger parallel to the surface of a layer of pigment or dye filled photosensitive composition, i.e., photocurable compositon which has been cast directly on a transparent support capable of transmitting a substantial amount of radiation therethrough e.g., polyethylene-terephthalate, polystyrene, cellulose acetate, etc.; and adjusted for uniformity of height by suitable means, e.g., a drawbar, precast mold and the like. The layer of photosensitive composition can be covered with a film layer to form a sandwich, if desired. The layer of the photosensitive composition is exposed through the transparency and the transparent support to a source of actinic light suitably in the wavelength range of 2200–4000 A., until the layer is cured to an insoluble stage in the exposed areas.

If the photosensitive composition is sandwiched between the transparent support layer and another layer, then the two layers are pulled apart leaving on the transparent support a cured reverse image of the transparency and uncured polymer. The transparent support bearing the reverse image is then subjected to development by removal of the uncured polymer with an appropriate solvent. The photographic transparency is thereafter dried in air or in an oven at elevated temperatures up to about 150° C.

The resulting image on its transparent support or backing may be further processed in a number of ways, e.g., converted into photographic prints by any conventional process, or transparency may be used for projection, by projecting the image as is, or laminate the transparency to another sheet of clear, transparent plastic to prevent possible handling damage to the image material.

The subject chain-extended polythioether containing polymer compositions are generally more reactive photosensitive materials than similar non-chain-extended polyene/polythiol containing compositions. For example, a photosensitive composition containing water soluble chain-extended polythiol ether containing polyene-polythiol polymer formed by photopolymerizing the components to the gel point, when exopsed under an Ascorlux lamp (delivering 4000 $\mu w./cm.^2$) through 1/8" glass and a 35 mm. silver halide negative gave contact prints with exposure times of 0.05 to 0.1 second. Similar contact prints from non-chain extended polyene/polythiol compositions require exposure lines of at least 1 to 3 seconds. Generally, the subject photocurable chain-extended polythioether containing polymer compositions require exposure energies from about 0.01 mj./cm.$^2$ to about 10 mj./cm.$^2$ in order to produce a cured film having a thickness of about 80–100$\mu$.

A method of measuring the speed of photosensitive materials is to determine the exposure energy required to give photographic films having certain properties, e.g., diffuse density values. Generally, exposure energy values necessary to give a film having a diffuse density of 1.0 are compared for various photosensitive materials. As used herein, films formed from the subject photosensitive compositions having a diffuse density of 1.0 refer to cured pigmented chain-extended polythioether containing polymer films having a thickness of 80–100$\mu$. Thus, commercially available photographic materials such as Warren 1264 film or Horizons E–174 film require exposure energy of 31 mj./cm.$^2$ and 300 mj./cm.$^2$ respectively to give a diffuse density of 1.0. In contrast, the pigmented chain-extended polythioether containing polymer compositions of the instant invention, e.g., a chain-extended photocurable composition formed by the oxygenation technique or a chain-extended photocurable composition formed by a photopolymerization, i.e., pre-exposure technique, require exposure energy of 1.3 mj./cm.$^2$ and 0.12 mj./cm.$^2$ respectively to give a diffuse density of 1.0. As can be seen, the improved photosensitive compositions of the instant invention are 23 to 230 times faster than the aforementioned commercially available products.

The chain-extended polythioether containing polymer photographic films generally exhibit spectral sensitivity at wavelengths from 290 to 430 nanometers.

The fast speed chain-extended polythioether containing polymer compositions of the subject invention are particularly suitable for use in preparing imaged surfaces via projection techniques. Since the projection technique utilizes small amounts of light to expose photosensitive materials, the latter materials must therefore be highly reactive photosensitive compositions. Thus, the instant chain-extended polythioether containing polymer compositions are extremely suitable for preparing imaged surfaces such as projection exposed photoresists, offset or letterpress printing plates and the like.

The molecular weight of the polyene reactants and the chain-extended polythioether containing polyene-polythiols, polyenes or polythiol products of the instant invention can be measured by various conventional methods including solution viscosity, osmotic pressure and gel permeation chromatography. Additionally, the molecular weight can be sometimes calculated from the known molecular weight of the reactants.

The viscosity of the polyenes or chain-extended polythioether containing polymers and polythiols may be measured on a Brookfield viscometer at temperatures up to 130° C. in accord with the instructions therefor.

The following examples will aid in explaining, but should not be deemed as limiting the instant invention. In all cases unless otherwise noted, all parts and percentages are by weight.

PREPARATION OF THE POLYENE PREPOLYMERS

Example 1

To a 2-liter flask equipped with stirrer, thermometer and gas inlet and outlet was charged 400 g. of a polyethyleneether glycol having a molecular weight of 400 (1.0 mole) and 200 g. of a polyethyleneether glycol having a molecular weight of 4000 (0.5 mole). Stirring was commenced and the flask was heated to 65° C. The flask was evacuated with a vacuum pump to remove any water present. After evacuation, two drops of dibutyl tin dilaurate (catalyst) was added and 207 ml. of allyl isocyanate was added by means of an addition funnel over a 2 hour period. The reaction was continued at about 65° C. for 8 hours. The flask was then reevacuated by means of vacuum to remove excess allyl isocyanate. The thus formed allyl-terminated polymer, i.e., N,N'-diallyl urethane of poly(ethylene oxide) will hereinafter be referred to as Prepolymer A.

Example 2

To a 2-liter flask equipped with stirrer, thermometer and gas inlet and outlet was charged 450 grams (0.45 mole) of a polytetramethyleneether glycol having a hydroxyl number of 112 and a molecular weight of approximately 1000 along with 900 grams (0.45 mole) of polytetramethyleneether glycol having a hydroxyl number of 56 and a molecular weight of about 2000, both commercially available from Quaker Oats Co. The flask was heated to 110° C. under vacuum and nitrogen and maintained thereat for 1 hour. The flask was then cooled to approximately 70° C. whereat 0.1 gram of dibutyl tin dilaurate was added to the flask. A mixture of 78 grams (0.45 mole) of tolylene diisocyanate and 77 grams (0.92 mole) of allyl isocyanate was then added to the flask dropwise with stirring. The reaction was maintained at 70° C. for 1 hour after addition of the reactants. The thus formed allyl terminated polymer will hereinafter be referred to as Prepolymer B.

The following examples illustrate the formation of photosensitive films.

Example 3

200 g. of Prepolymer A, 66 g. pentaerythritol tetrakis ($\beta$-mercaptopropionate) commercially available from Carlisle Chemical Co. under the trade name of "Q–43," 20 g. benzophenone, 10 g. carbon black (Sterling R), 20 g. glycerine and 0.53 g. di-N-octadecylphosphite were admixed together and stirring was continued at about 40° C. for about 15 minutes to obtain a homogeneous mixture.

A 0.5 mil thick layer of the thus formed photosensitive polymer composition was then coated by means of a drawbar onto a clear UV transparent polyethylene terephthalate, i.e., Mylar film (5 mil thick) and another 5 mil thick sheet of Mylar was rolled on top of the photosensitive admixture to produce a sandwich. The thus formed sandwich was cut into 35 mm. length strips.

Example 4

A 35 mm. length strip of the film sandwich formed in Example 3 was attached to the backing plate of a slitted film holder of a xenon high intensity monochromator system. This monochromatic light system consists of a light source from a 900 watt Hanovia quartz xenon lamp and housing equipped with a blower assembly. The xenon lamp is powered by a 30 a.–120 v. Arc Lamp Supply equipped with a 25,000 v.–50 a. RF starter (Electro-Powerpacs Corp.). The light originating from the xenon source passes through an optical system mounted on a base in the following sequence: 2 Esco-Optics 2½" diameter plano-convex quartz condenser lenses having a focal length of 3" and 8", followed by a cast aluminum water filter with two removable 2" diameter quartz end plates. This water filter serves to absorb the infrared radiation from the light beam to protect the grating assembly which is located directly behind the water filter. This assembly is a Bausch and Lomb "High Intensity" monochromator grating assembly having adjustable entrance and exit slits. This monochromator grating assembly is followed by a lenseless Iris shutter behind which is located a slitted film holder having a metal frame with a stationary metal face plate having a slit opening (⅛" x ½") and a removable backing plate. The strip of film sandwich can be attached to the backing plate and the film containing backing plate placed into the film holder. The film strip between the two supporting plates is held in such a manner that it can be moved freely so that selected portions of the film can be exposed when reaching the slit opening in the metal frame. The afore-described non-collimated system provides a monochromatic diverging exit light beam of f/3.5. The light beam can be easily collimated if desired by placing collinator lens between the exit slit of the monochromator grating assembly and the shutter.

Using a bandpass value of 10.0 nm. (nanometers) and f/3.5 the film was then exposed to the monochromatic light for various lengths of time at a wavelength of 340 nm. The sandwich was peeled apart resulting in a cured latent image adhering to the Mylar sheet proximate the slitted metal face plate, i.e. one identical to the slit opening of the metal face plate through which the light passed. The image bearing layer was developed by washing in warm water at 50° C. for about 15 seconds to remove the uncured polymer from the unexposed areas. The thus developed film was then air dried and a cured image bearing transparency was obtained. The energy required to give a diffuse density of 1.0 for the above formed image bearing film was 58.0 millijoules/cm.$^2$.

The following example illustrates the formation of self-photocurable polymer compositions via an oxygenation technique.

Example 5

20 g. of Prepolymer A, 66 g. of pentaerythritol tetrakis($\beta$ - mercaptopropionate), 15 g. of carbon black (Sterling FT), 20 g. glycerine and 20 g. benzophenone were added into a 2 l. dark glass flask equipped with a stirrer, thermometer and a gas inlet and outlet. The reaction mixture was stirred under an oxygen blanket at a temperature of about 55° C. for a period of two days. Thereafter, a viscous liquid chain-extended completely water soluble polymer having polythioether linkages was obtained. This product will hereinafter be referred to as chain-extended polymer Composition I.

Samples of this formed-chain extended product were placed in cold storage at 4° C. for varying lengths of time. The samples exhibited very good storage stability.

Example 6

A sample of the chain-extended polymer Composition I formed in Example 5 which had been stored at 5° C. for two weeks was placed in a beaker and heated with stirring to about 40° C. to form a melted photocurable polymer composition.

A 0.5 mil film of the photocurable mixture was spread on a 5 mil sheet of clear "Mylar" and another sheet of clear "Mylar" was rolled on top of the photocurable mixture to produce a sandwich which was subsequently cut into 35 mm. length strips.

Following the procedures outlined in Example 4, a cured image bearing transparency was obtained which had an energy requirement of 1.2 millijoules/cm.$^2$ in order to give a diffuse density of 1.0.

As can be seen from the exposure energy requirement the photographic film formed the above chain-extended polymer composition is about 48 times faster than that formed from the non-chain-extended photocurable composition of Example 4.

Example 7

Example 6 was repeated except that the chain-extended polymer composition which had been stored at 4° C. for four weeks was substituted for the chain-extended polymer composition which had been stored at 4° C. for 2 weeks. An image bearing transparency film was obtained which had identical energy requirements as that formed in Example 6.

Example 8

0.3 part of octadecyl β-(4-hydroxy-3,5-di-t-butyl phenyl) propionate comercially available from Geigy-Ciba under the trade name Irganox 1076 and 0.2 part of phosphorous acid were admixed with 100 parts of chain-extended photocurable Composition I. The thus formed stabilized photocurable composition was then stored in a dark vessel at about 25° C. for a period of four weeks. This sample was then heated to about 40° C. to form a homogeneous mixture.

A 0.5 mil film of the above formed photocurable mixture was spread on a 5 mil sheet of clear UV transparent cellulose diacetate and another sheet of clear cellulose diacetate was rolled on top of the photocurable mixture to produce a sandwich which was then cut into 35 mm. length strips.

Following the procedures outlined in Example 4 cured image bearing transparency was obtained. The energy required to give a diffuse density of 1.0 for the above formed image bearing film was 0.70 millijoule/cm.$^2$.

The following examples illustrate the formation of chain-extended polythioether containing polythiols and photo-curable compositions thereof.

Example 9

To a 1-l. flask equipped with a stirrer and thermometer was added 16.8 g. (a four fold stoichiometric excess) of pentaerythritol tetrakis(β-mercaptopropionate) and 0.15 g. of dibenzosuberone. The reaction flask was placed under a sunlamp delivering 4000 μw./cm.$^2$ and 15.0 g. of melted allyl terminated Prepolymer A was added dropwise with stirring over a 10 minute period.

The reaction mixture was maintained at about 40° C. for ½ hour. Thereafter a liquid solvent soluble chain-extended polythioether containing polythiol composition was obtained.

Example 10

To the polythiol composition formed in Example 9 45.0 g. of Prepolymer A was added to give the desired 1:1 stoichiometry along with 5.85 g. of dibenzosuberone, 4.5 g. of carbon black (Sterling FT), 6.0 g. of glycerine and 0.15 g. di-N-octyldecyl-phosphite. These reactants were stirred in the dark at about 40° C. for 1 hour to obtain a homogeneous photocurable mixture.

The resulting photocurable mixture was divided in half and Samples 10A and 10B were prepared. Sample 10B was stored in the dark at about 25° C. for 4 days prior to being processed.

Example 11

Following the procedures outlined in Example 9 and using 20.0 g. of allyl terminated Prepolymer A, 16.8 g. (a three-fold stoichiometric excess) of pentaerythritol tetrakis(β-mercaptopropionate) and 0.4 g. of benzophenone, a liquid, solvent soluble, chain-extended polythioether containing polythiol composition was obtained.

Example 12

To the polythiol composition formed in Example 11, 40.0 g. of Prepolymer A was added to give the desired 1:1 stoichiometry along with 5.4 g. of benzophenone, 6.0 g. of glycerine and 4.5 g. of carbon black (Sterling FT). After stirring the reactants in the dark at about 25° C. for about 14 hours a homogeneous photocurable mixture was obtained. A 70 g. portion of this photocurable mixture was utilized as Sample 12A while Sample 12B was prepared by adding 0.64 g. of benzanthrone to 20 g. of the above formed photocurable mixture. The ingredients were heated to about 40° C. with stirring until a melted photocurable composition was obtained.

Example 13

Following the procedures outlined in Example 9 and using 30.0 g. of the allyl terminated Prepolymer A, 16.8 g. (a two-fold stoichiometric excess) of pentaerythritol tetrakis(β-mercaptopropionate) and 0.60 g. of benzophenone, a liquid, solvent-soluble, chain-extended polythioether containing polythiol composition was obtained.

Example 14

To the polythiol product formed in Example 9, 30.0 g. of Prepolymer A was added to give the desired 1:1 stoichiometry along with 2.4 g. of carbon black (Sterling FT). The reactants were stirred in the dark at about 40° C. for 1 hour and a homogeneous photocurable mixture was obtained which will hereinafter be referred to as Sample 14A.

The following examples illustrate the formation of self-photocurable polymer compositions in a pre-exposure technique.

Example 15

60 g. of Prepolymer A, 19.8 g. of pentaerythritol tetrakis(β-mercaptopropionate) and 0.03 g. of dibenzosuberone was placed in a beaker and heated to about 40° C. with stirring to form a homogeneous photosensitive polymer mixture.

13.0 g. of the above formed mixture was poured into a 100 x 50 mm. crystallizing dish to give about 1/16" thick film of photosensitive polymer. The thus formed film was preexposed with stirring under a sunlamp at a surface radiation intensity of 2500 μw./cm.$^2$ for 21 seconds. (Note: under the same conditions the normal gel point of this polymer composition occurs at 26 seconds.) A viscous chain-extended solvent soluble polymer composition having polythioether linkages as well as free unreacted thiol and allyl groups was obtained. This polymer is self-curable in the presence of free radical generator.

15.0 g. of the above formed chain extended polymer was poured into a beaker and 1.47 g. dibenzosuberone,

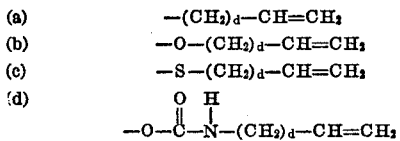

1.5 glycerine and 1.13 g. carbon black (Sterling FT) was added. The mixture was stirred at about 40° C. for 45 minutes. A homogeneous photocurable mixture was obtained which will hereinafter be referred to as Sample 15A.

Example 16

Example 15 was repeated except that the photosensitive polymer film was preexposed under the sunlamp 1/2 to the gel point. A liquid chain extended polythioether containing polymer having free unreacted thiol and allyl groups was obtained. A homogeneous photocurable mixture formed from the above polymer will hereinafter be referred to as Sample 16A.

Example 17

30 g. of Prepolymer B, 2.3 g. of pentaerythritol tetrakis-(β-mercaptopropionate) and 0.15 g. of dibenzosuberone were admixed with stirring until a homogeneous photosensitive polymer mixture was obtained.

A 1/16" film of this polymer mixture was formed in the same manner as described in Example 15, and the film preexposed with stirring under a sunlamp delivering 2500 μw./cm.² for 25 seconds (i.e. up to but not at the gel point of the polymer composition). A liquid, chain-extended, solvent soluble polythioether containing polymer was formed. This polymer which contains free unreacted thiol and allyl groups is self-curable in the presence of a free radical generator.

To 100 parts of the above formed polythioether containing polymer composition was added 7.5 parts of carbon black (Sterling FT), 10 parts of glycerine and 9.5 parts of dibenzosuberone. The mixture was stirred until a homogeneous photocurable composition was formed hereinafter referred to as Eample 17A.

Example 18

Photosensitive films were prepared from the photocurable compositions formed in Examples 10, 12 and 14 to 17.

A 0.5 mil film of the photocurable composition was coated on a 5 mil sheet of clear Mylar and a sheet of clear Mylar was rolled on top of the photocurable mixture to produce a sandwich which was then cut into 35 mm. strips.

An image bearing transparency was prepared according to the steps outlined in Example 4 except that the photocurable film was exposed to monochromatic UV light having various wavelengths instead of only at 340 nm., and the image bearing layer of Sample 17A was developed by washing in ethanol at room temperature. The results are listed in the table below.

| Sample | Exposure wavelength (nm.) | Energy required to give diffuse density of 1.0 (J/cm.²) |
|---|---|---|
| 10A | 350 | 7.5 |
| 10B | 350 | 8.0 |
| 12A | 340 | 1.84 |
| 12B | 420 | 8.7 |
| 14A | 340 | 4.0 |
| 15A | 350 | 0.13 |
| 16A | 350 | 6.1 |
| 17A | 360 | 3.7 |

What is claimed is:

1. A process of forming a polymer composition rapidly curable to a cross-linked, solid cured polythioether product which comprises:
   (a) adding with stirring a polythiol component having a molecular weight in the range of about 200 to 20,000 of the general fomula: $R_8$—$(SH)_n$ wherein $R_8$ is a polyvalent organic moiety free of reactive carbon to carbon unsaturation and $n$ is at least 2, to an excess of a polyene component having a molecular weight in the range of 200 to 20,000 of the general formula: A—$(Y)_m$ wherein $m$ is at least 3 and Y is a member selected from the group consisting of (a) —$(CH_2)_d$—CH=$CH_2$
   (b) —O—$(CH_2)_d$—CH=$CH_2$
   (c) —S—$(CH_2)_d$—CH=$CH_2$
   (d) $$-O-\overset{O}{\underset{\|}{C}}-\overset{H}{\underset{|}{N}}-(CH_2)_d-CH=CH_2$$

wherein one or more of said members (a) to (d) are connected to A through a polyvalent chemically compatible derivative member of the group consisting of —O—, —S—, urethane and substituted urethane, carboxyllate, carbonate, urea and substituted urea, amide and substituted amide, amine and substituted amine, silane and substituted silane, phosphate, phosphonate, aryl and substituted aryl, alkaryl and substituted alkaryl, cycloalkyl and substituted cycloalkyl and alkyl and substituted alkyl groups containing 1 to 36 carbon atoms, said group members can be internally connected to one another by a polyvalent chemically compatible linkage selected from the group consisting of —O—, —S—, carboxylate, carbonate, carbonyl, urethane and substituted urethane, urea and substituted urea, amide and substituted amide, amine and substituted amine, silane and substituted silane, silicate, phosphonate, phosphite, phosphate, aryl and substituted aryl, alkaryl and substituated alkaryl, cycloalkyl and substituted cycloalkyl and alkyl having 1 to 16 carbon atoms; in the presence of actinic radiation or an atomsphere of oxygen, with the polyene component being present in the final mixture in at least twofold stoichiometric excess of the polythiol component to form a solvent soluble, chain-extended essentially gel-free polythioether containing polyene polymer essentially free of thiol groups and having a functionality of at least 4; and
   (b) admixing to said chain-extended polythioether containing polyene polymer a sufficient amount of said polythiol component that the mole ratio of the ene groups to the thiol groups is from about 0.5/1.0 to about 2.0/1.0, said mixture being curable to a cross-linked solid cured product upon subsequent exposure to a free radical generator.

2. The process of claim 1 wherein the reaction in step (a) is carried out at ambient conditions in the presence of actinic radiation.

3. The process of claim 1 wherein the actinic radiation is ultraviolet radiation having a wavelength from about 2200 to 4000 A.

4. The process of claim 1 wherein the composition in step (a) contains a photosensitizer.

5. The process of claim 4 wherein the amount of said photosensitizer is from 0.01 to 10 percent by weight of the polyene/polythiol composition.

6. The process of claim 1 wherein said mixture in step (b) is exposed to a free radical generator for a time sufficient to form a cross-linked solid cured product.

7. The process of claim 6 wherein said free radical generator is actinic radiation.

8. The process of claim 7 wherein said mixture contains a photosensitizer.

9. A solid cured product prepared by the process of claim 6.

10. The process of claim 1 wherein the mole ratio of the ene groups to the thiol groups in said mixture in step (b) is from about 0.8/1.0 to about 1.2/1.0.

11. A composition curable to a cross-linked solid cured product consisting essentially of
   (a) a solvent soluble, chain-extended polythioether containing polyene polymer essentially free of thiol groups and having a functionality of at least 4, consisting essentially of a reaction product of (I) a polyene component having a molecular weight in the range of about 200 to 20,000 of the general formula:

A—(Y)$_m$ wherein $m$ is at least 3 and Y is a member selected from the group consisting of (a) —(CH$_2$)$_d$—CH=CH$_2$
(b) —O—(CH$_2$)$_d$—CH=CH$_2$
(c) —S—(CH$_2$)$_d$—CH=CH$_2$
(d) 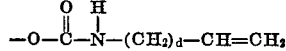

wherein one or more of said members (a) to (d) and connected to A through a polyvalent chemically compatible derivative member of the group consisting of —O—, —S—, urethane and substituted urethane, carboxylate, carbonate, urea and substituted urea, amide and substituted amide, amine and substituted amine, silane, and substituted silane, phosphate, phosphonate, aryl and substituted aryl, alkaryl and substituted alkaryl, cycloalkyl and substituted cycloalkyl and alkyl having 1 to 16 carbon atoms; wherein $d$ is an integer from 0 to 12; A is a stable, polyvalent, polymeric radical member free of (1) reactive carbon to carbon unsaturation and (2) highly water sensitive members; and is selected from the group consisting of aryl, substituted aryl, aralkyl, substituted aralkyl, cyclalkyl, substituted cycloalkyl and alkyl and substituted alkyl groups containing 1 to 36 carbon atoms, said group members can be internally connected to one another by a polyvalent chemically compatible linkage selected from the group consisting of O—O, —S—, carboxylate, carbonate, carbonyl, urethane and substituted urethane, urea and substituted urea, amide and substituted amide, amine and substituted amine, silane and substituted silane, silicate, phosphonate, phosphite, phosphate, aryl and substituted aryl, alkaryl and substituted alkaryl, cycloalkyl and substituted cycloalkyl and alkyl having 1 to 16 carbon atoms; and (II) a polythiol component having a molecular weight in the range of about 200 to 20,000 of the general formula: R$_8$—(SH)$_n$ wherein R$_8$ is a polyvalent organic moiety free of reactive carbon to carbon unsaturation and $n$ is at least 2; with the polyene component being in at least a twofold stoichiometric excess of the polythiol component and said polythioether containing polyene polymer being essentially gel free; and (b) a sufficient amount of said polythiol component that the mole ratio of the ene group to thiol groups is from about 0.5/1.0 to about 2.0/1.0, said mixture being curable to a cross-linked solid cured product upon exposure to a free radical generator.

References Cited
UNITED STATES PATENTS

| | | | |
|---|---|---|---|
| 3,661,744 | 5/1972 | Kehr et al. | 204—159.14 |
| 3,662,023 | 5/1972 | Kehr et al. | 260—858 |
| 3,531,317 | 9/1970 | Patheiger et al. | 204—159.15 |
| 2,505,067 | 4/1950 | Sachs et al. | 204—159.23 |

MURRAY TILLMAN, Primary Examiner

R. B. TURER, Assistant Examiner

U.S. Cl. X.R.

96—115 P, 115 R,; 117—93.31, 132 B, 132 R, 138.8 F, 148, 155; 204—159.15, 159.18, 159.23, 159.24; 260—17.4 R, 41 A, 41 B, 41 R, 41 AG, 63 UY, 77.5 BB, 77.5 CR, 77.5 MA, 77.5 AM, 79.5 B, 79.5 R, 79.5 NN, 858, 874

PO-1050
(5/69)

UNITED STATES PATENT OFFICE
CERTIFICATE OF CORRECTION

Patent No. __3,809,633__   Dated __May 7, 1974__

Inventor(s) __Frank Magnotta, Arthur D. Ketley and Clifton L. Kehr__

It is certified that error appears in the above-identified patent and that said Letters Patent are hereby corrected as shown below:

In Column 18, Claim 1, line 19 after the phrase "and alkyl" insert the following phrase: -- having 1 to 16 carbon atoms; wherein d is an integer from 0 to 12; A is a stable, polyvalent, polymeric radical member free of (1) reactive carbon to carbon unsaturation and (2) highly water-sensitive members; and is selected from the group consisting of aryl, substituted aryl, aralkyl, substituted aralkyl, cycloalkyl, substituted cycloalkyl and alkyl --.

In Column 19, Claim 11, line 24, "cyclalkyl" should read --cycloalkyl--; in line 29 the linkage "O-O" should read -----O-----.

Signed and sealed this 22nd day of October 1974.

(SEAL)
Attest:

McCOY M. GIBSON JR.
Attesting Officer

C. MARSHALL DANN.
Commissioner of Patents